(12) United States Patent
Wiseman et al.

(10) Patent No.: US 9,208,312 B2
(45) Date of Patent: Dec. 8, 2015

(54) CHECKING DATA CONTENT

(75) Inventors: Simon Robert Wiseman, Malvern (GB); Katherine Jane Hughes, Malvern (GB)

(73) Assignee: QINETIQ LIMITED (GB)

( * ) Notice: Subject to any disclaimer, the term of this patent is extended or adjusted under 35 U.S.C. 154(b) by 60 days.

(21) Appl. No.: 13/503,271

(22) PCT Filed: Oct. 20, 2010

(86) PCT No.: PCT/GB2010/001936
§ 371 (c)(1),
(2), (4) Date: Apr. 20, 2012

(87) PCT Pub. No.: WO2011/048366
PCT Pub. Date: Apr. 28, 2011

(65) Prior Publication Data
US 2012/0226914 A1 Sep. 6, 2012

(30) Foreign Application Priority Data
Oct. 22, 2009 (GB) .................................. 0918478.9

(51) Int. Cl.
*G06F 21/56* (2013.01)
(52) U.S. Cl.
CPC ...................... *G06F 21/56* (2013.01)
(58) Field of Classification Search
None
See application file for complete search history.

(56) References Cited

U.S. PATENT DOCUMENTS 7,107,618 B1 9/2006 Gordon et al.
7,362,902 B1* 4/2008 Baker et al. .................... 382/229
2003/0051154 A1* 3/2003 Barton et al. .................. 713/201
2003/0191963 A1* 10/2003 Balissat et al. ................ 713/201
(Continued)

FOREIGN PATENT DOCUMENTS

| WO | WO 02/103533 | 12/2002 |
| WO | WO 03/010670 | 2/2003 |
| WO | WO 03/094418 | 11/2003 |

OTHER PUBLICATIONS

Schmall, "Building an Aniti-Virus Engine", Retrieved from the Internet: URL:http://bandwidthco.com/sf_whitepapers/malwar/Building%20an%20Anti-Virus%20Engine.pdf, Mar. 4, 2002, pp. 1-7.

*Primary Examiner* — David Le
(74) *Attorney, Agent, or Firm* — McDonnell Boehnen Hulbert & Berghoff LLP

(57) ABSTRACT

A system for automated checking of data content includes content checkers (208) to (214) arranged in parallel and connected between an input sub-system (204) and an output sub-system (216). The content checkers (208) to (214) check different data formats. Incoming data from an external computer system (202) is passed by the input sub-system (204) to the checkers (208) to (214), which report check results to both input and output sub-systems (204) and (216). From the four check results, the input sub-system (204) judges the data's acceptability for forwarding to a sensitive computer system (218). Unacceptable data is discarded; acceptable data passes to the output sub-system (216), which also judges the data's acceptability from the four check results. The output sub-system (216) only receives such data if the check results are all positive or if the input sub-system (204) malfunctions: in the latter case the check results are not all positive, and the output sub-system (216) will not forward the data unless it also malfunctions. The decision to forward data is therefore split between the input and output sub-systems (206) and (216).

15 Claims, 7 Drawing Sheets

(56) References Cited

U.S. PATENT DOCUMENTS

2005/0172339 A1* 8/2005 Costea et al. .................. 726/22
2007/0033419 A1* 2/2007 Kocher et al. ................. 713/193
2007/0169184 A1 7/2007 Krywaniuk
2009/0260087 A1 10/2009 Ishida et al.

* cited by examiner

CHECKING DATA CONTENT

FIELD OF THE INVENTION

This invention relates to checking data content, and to a method, a computer system and computer software for implementing it. More particularly, although not exclusively, it relates to content checking for data to be passed between computer systems.

BACKGROUND OF THE INVENTION

It is normal practice to check that data is fit for purpose before it is passed between computer systems, particularly if one of the computer systems handles sensitive information. Data entering a receiving system may be checked to ensure that it is not associated with an attack against that system and its software applications; data leaving a computer system may be checked to ensure it is not being disseminated inappropriately ("leaked"), e.g. contrary to commercial-in-confidence restrictions.

Software products are commercially available for checking that data is not infected with a virus or carrying other kinds of malware such as key loggers: such products include those of Symantec, Sophos and Macaffe. Other products, e.g. those of Clearswift and Purifile, check that data leaving a computer system is not sensitive data being disseminated inappropriately.

A typical prior art arrangement involves a sensitive computer system receiving data after checking that the data is safe and is not part of an attack. Data output from the sensitive system is checked to ensure that it is not being leaked.

However, software products (content checkers) which carry out data checking are themselves potential targets for an attack, particularly if they are running on computer systems handling sensitive material, such as financial transactions. If an attacker makes an attack which succeeds in taking control of a content checker running on a sensitive computer system, the attacker can then disable checks implemented by the checker and thereby allow data to pass inappropriately or use the checker as a platform for launching a further attack against the system.

Software engineering techniques are known which are intended to make content checkers robust against attack, but unfortunately they are not foolproof. Prior art content checkers are therefore associated with potential for failure, which may not be acceptable in critical situations.

It is known to reduce the potential for failure in a computer system by providing for failure restricted to a single component being unable to cause overall system failure: here "system failure" means data passing from one computer system to another without being appropriately checked.

In one prior art arrangement, a sensitive computer system sends data to and receives data from an external computer system via an input/output sub-system linked to a content checker; data passed by the content checker is forwarded to the recipient system. A single failure of either the input/output sub-system or the content checker could lead to overall system failure. If the checker fails to identify inappropriate data and instead wrongly reports it fit to pass, then that data will be passed on and cause damage to a recipient system. Alternatively, the input/output sub-system may fail by passing on data which has not been checked.

A known technique for guarding against failure of a check is to implement the check twice independently, it being unlikely that two independent checks will fail simultaneously: a prior art example of this is two anti-virus products being combined to provide a defence against viruses. If two content checkers are used, both must clear data before it is allowed to pass: even this safeguard may be defeated by failure of an input/output sub-system.

A potential single point of failure represented by an input/output sub-system may be eliminated by dividing it into separate input and output sub-systems with content checking means arranged between them. These sub-systems cease to be single points of failure because the input sub-system can only pass data for content checking, and the output sub-system only receives data which content checking indicates is fit to pass. A single content checker can be a point of failure, but this can be avoided by using two centrally located content checkers arranged in parallel to perform checks simultaneously. An output sub-system receives results from both content checkers and compares them: if both indicate the data passes the checks, the data is passed on. This is an example of the prior art technique of modular redundancy with voting on the outputs. Its disadvantage is that it is necessary to be sure that the two content checkers fail independently, which is difficult to ascertain if the checkers are complex and must handle many different data formats. As more formats need to be handled, the possible dependencies grows so it is difficult to scale up the task of assessing independence.

Voting is usually applied to streams of data that should be identical. For example, an encryption device can be made robust by implementing the encryption twice in parallel and then comparing the outputs, passing encrypted data on only if the two streams are identical. In the case of content checking however, the voting component is more complicated as it must implement a go/no-go decision based on the varied results received from the checkers rather than just compare identical data streams. This complexity makes it difficult to construct the voting component without it becoming a single point of failure.

There is also a need to deal with different types of data or data formats requiring different checkers. A checker arrangement with functionality for all necessary checks can be vulnerable to attack, and establishing that there are no single points of failure is difficult.

SUMMARY OF THE INVENTION

It is an object of the present invention to provide an alternative form of and means for checking data content suitable for use with multiple data types or formats.

The present invention provides an automated method of checking data content comprising using a computer system to implement the steps of:
 a) receiving incoming data and subjecting it to multiple different content checks,
 b) allowing the incoming data to pass from an input to an output if the data has passed the content checks, and
 c) making the data available for further processing if the output at least receives the data and the multiple different content checks provide an indication that the data has passed the content checks.

The present invention provides the advantage that data is only allowed to pass on if multiple content checking finds it is fit to pass. If a malfunction occurs, system failure resulting in data being passed on inappropriately is avoided because passed the content check results are confirmed at both input and output. This reduces the scope for inappropriate data transfer due to a single point of failure at e.g. input or output.

The data may be made available to the output in response to the input receiving a request in this regard associated with the output in addition to the indication that the data has passed the content checks.

In a preferred embodiment of the invention, the method includes:
- a) applying a cryptographic hash function to data which has passed its respective content check to generate a checking hash value,
- b) applying the cryptographic hash function to data which has passed from the input to generate a verification hash value and comparing the checking hash value with the verification hash value, and
- c) passing on the data for further processing in the event that the checking hash value is the same as the verification hash value and the data which has passed from the input has been indicated to have passed the content checks.

In this embodiment the invention avoids a failure mode comprising an input failing by sending different data for checking as compared to data that it sends to output. If the input sends acceptable data for checking but unacceptable data to output, the output will receive all positive checker outcomes and will therefore wrongly determine that the unacceptable data is suitable for passing on for further processing. Using a cryptographic hash approach, the output can use the hash value to confirm that data received from input is the same as that sent for checking.

In another embodiment of the invention, the method includes:
- a) encrypting the incoming data and depositing such encrypted data in a store,
- b) decrypting the encrypted data, performing the multiple different content checks and storing the results of such check in the store together with digital signatures associated with respective verifiable checks by the input and the output,
- c) making the incoming data available for output in decrypted form for further processing in the event at least that the data has passed the content checks and the digital signatures are valid.

In this embodiment the invention avoids a failure mode at output comprising passing on decrypted data which has failed one or more checks, because such data will not have been decrypted at input unless that has also malfunctioned: i.e. at least two simultaneous failures would be required, and so a single point of failure does not result in unacceptable data being forwarded.

The multiple content checks may provide one of three outcomes as follows, i.e. data is (a) recognised and accepted, (b) recognised and rejected or (c) not recognised. They may be performed by suites of content checkers, the suites having been specified and developed independently of one another. Multiple content checking may be used to detect data embedded in an incoming data item, the embedded data and the data item having different formats; the method then includes recycling the embedded data for further multiple content checking, and, if data already checked in the data item is acceptable, continuing to check data remaining unchecked in the data item.

In another aspect, the present invention provides an apparatus for automated checking of data content comprising a computer system programmed to implement the steps of:
- a) receiving incoming data and subjecting it to multiple different content checks,
- b) allowing the incoming data to pass from an input to an output if the data has passed the content checks, and
- c) making the data available for further processing if the output at least receives the data and the multiple different content checks provide an indication that the data has passed the content checks In a further aspect, the present invention provides a computer program product comprising a computer readable medium containing computer readable instructions for controlling operation of a computer system to undertake automated checking of data content by implementing the steps of:
- a) receiving incoming data and subjecting it to multiple different content checks,
- b) allowing the incoming data to pass from an input to an output if the data has passed the content checks, and
- c) making the data available for further processing if the output at least receives the data and the multiple different content checks provide an indication that the data has passed the content checks.

The apparatus and computer program product aspects of the invention provide a like advantage and have optional preferred features equivalent mutatis mutandis to those of the method aspect.

DESCRIPTION OF THE DRAWINGS

Embodiments of the invention will now be described, by way of example only, with reference to the accompanying drawings. The drawings are only for the purposes of illustrating embodiments of the invention and contrasting the invention with the prior art: they are not to be treated as limiting either the invention or the accompanying claims. In the drawings:

DESCRIPTION OF THE INVENTION

In the following description of prior art and embodiments of the invention, for clarity and convenience of description, functional elements are referred to in a similar way to separate and distinct items of apparatus, e.g. content checkers, input and output sub-systems and data storage. The functionality described for such elements may be implemented by one or more software applications running on a single computer, such as a sensitive computer which the application or applications protect. Consequently, for example, the expressions checker, checker suite and input or output sub-system include sets of instructions which control a computer system to implement the functionality of such checker, suite or sub-system.

Figure 1:
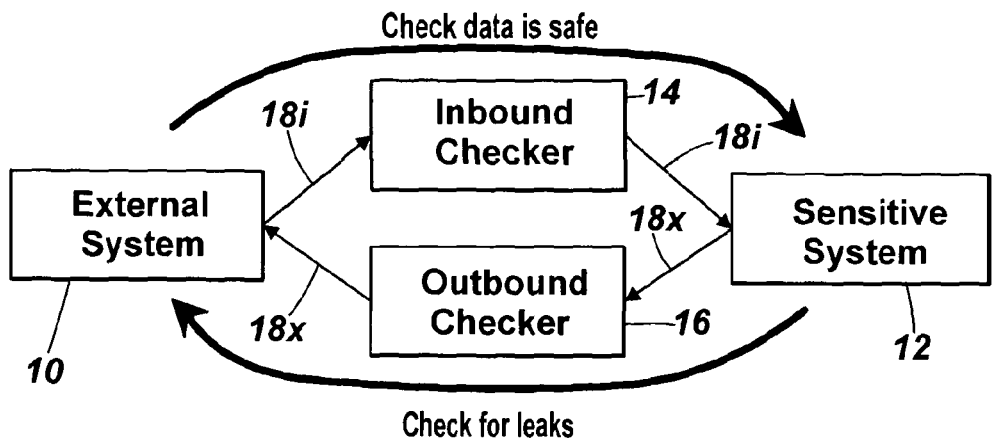
FIG. 1 illustrates a prior art technique for checking data passing between computer systems.

Referring to FIG. 1, a prior art technique for checking data passing between an external computer system 10 and a sensitive computer system 12 employs inbound and outbound content checkers 14 and 16. As indicated by arrows 18*i*, inward bound data passes from the external computer system 10 to the sensitive computer system 12 via the inbound checker 14, which ensures that the data is safe and not part of an attack. As indicated by arrows 18*x*, outward bound data passes from the sensitive system 12 to the external system 10 via the outbound checker 16, which ensures that the data is not sensitive data being leaked. If an attacker makes an attack which succeeds in taking control of one of the content checkers 14 or 16, the attacker can then disable checks implemented by the content checker and allow data to pass unchecked. Each of the content checkers 14 and 16 therefore represents a potential single point of failure.

One approach to reducing the likelihood of failure is to engineer checking arrangements so that no single component failure can lead to overall system failure, defined as unchecked data passing from one network to another. Although the principle of avoiding single points of failure is well known, it is less clear how this principle can be applied to a content checker.

Figure 2:
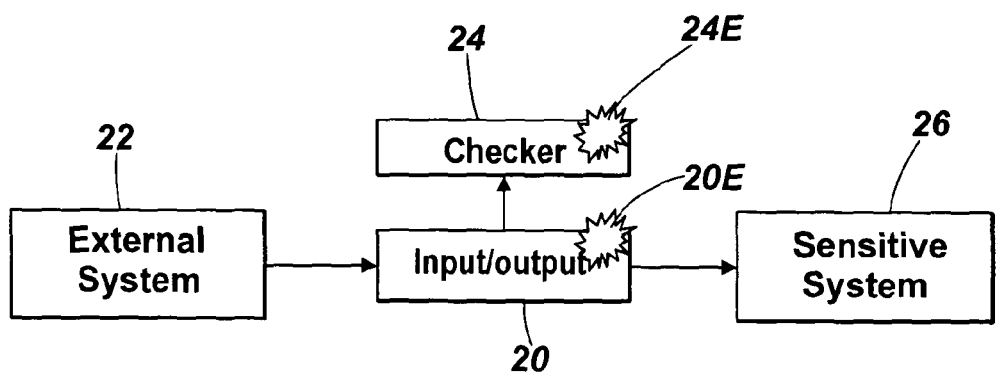
FIG. 2 shows a prior art single content checker arrangement for inbound data.

One known checker arrangement is shown in FIG. 2, in which an input/output sub-system 20 takes inward bound data from an external system 22 and passes it to a checker 24 which applies content checks. If the data passes the checks, the input/output sub-system 20 forwards the data on to a sensitive computer system 26 intended to be protected by the checks. Likewise, an outbound checker (not shown) checks outward bound data passing from the sensitive system 26 to the external system 22. As indicated by respective explosion symbols 20E and 24E, each of the input/output sub-system 20 and the checker 24 is a potential single point of failure, because failure of either one or both of these could lead to an overall failure. If the checker 24 fails to identify inappropriate data, and instead wrongly reports that it is fit to pass, then it will be delivered by the input/output sub-system 20 causing damage of some form to a recipient system. Alternatively, the input/output sub-system 20 may fail by passing data unchecked directly from the external system 22 to the sensitive system 26.

Figure 3:
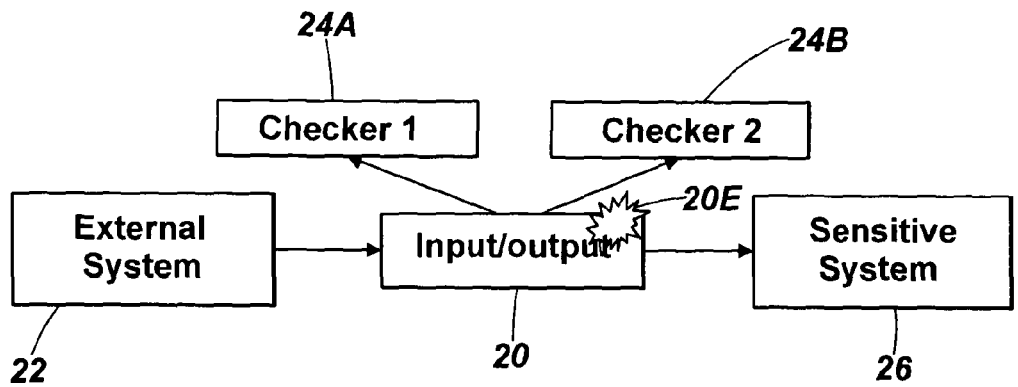
FIG. 3 is equivalent to FIG. 2 using two checkers.

It is known to guard against failure of a check by implementing the check twice, using independent designs of content checker. If one checker fails to identify inappropriate data then the other checker should successfully do so—since the two checkers are independent it is unlikely both will fail simultaneously. One example of two content checkers used together is a combination of multiple anti-virus products from different vendors to improve defence against viruses. FIG. 3 shows such a two-checker arrangement: parts equivalent to those described earlier are like referenced. FIG. 3 is equivalent to FIG. 2 with the sole exception that the input/output sub-system 20 communicates with two checkers 24A and 24B which both apply content checks. The input/output sub-system 20 forwards data to the sensitive system 26 only if both checkers indicate that such data can be passed on. Neither of the checkers 24A and 24B is a single point of failure due to the presence of the other checker. However, the input/output sub-system 20 remains a single point of failure as indicated by explosion symbol 20E because it may fail to invoke the checkers 24A and 24B or fail to assess their results correctly.

Figure 4:
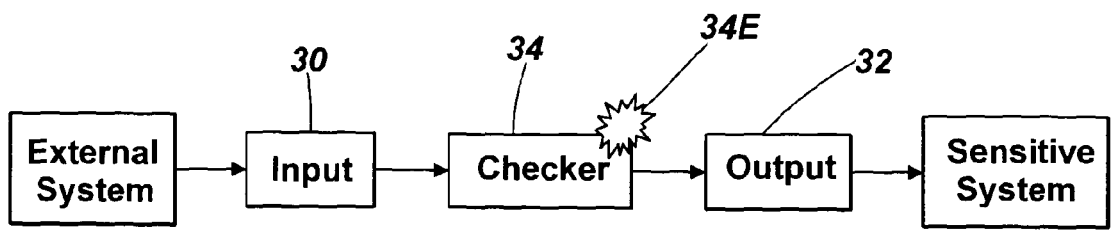
FIG. 4 shows a prior art checker arrangement with a single centrally located checker.

Referring now to FIG. 4, a single point of failure of an input/output sub-system is eliminated by dividing it into an input sub-system 30 and a separate output sub-system 32 with an intervening content checker 34. With this arrangement, the input sub-system 30 ceases to be a single point of failure, because all it can do is pass data to the checker 34. The output sub-system 32 is not a single point of failure either, because it only receives data that the checker 34 regards as fit to pass. However, the checker 34 remains a single point of failure, as indicated by explosion symbol 34E, because it may fail to assess the content correctly.

Figure 5:
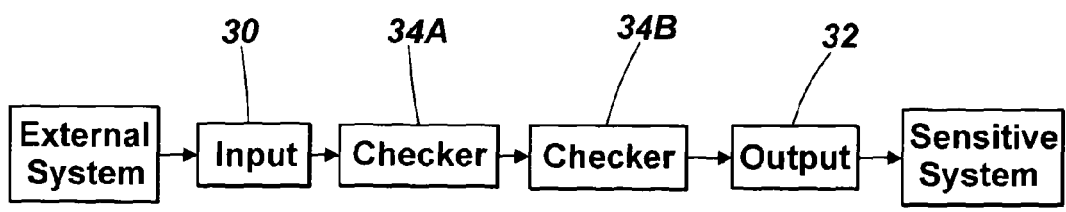
FIG. 5 shows a checker arrangement with two centrally located checkers in series.

Although it is not prior art so far as the inventors are aware, it is possible to avoid the checker 34 being a single point of failure by using the arrangement shown in FIG. 5, in which parts equivalent to those described earlier are like referenced. FIG. 5 is equivalent to FIG. 4 with the single checker 34 replaced by two checkers 34A and 34B connected in series, i.e. the output of checker 34A feeds the input of checker 34B. Both checkers 34A and 34B apply content checks which data must pass to allow it to be forwarded to a sensitive system 36: i.e. only if both checkers deem data to be acceptable does it pass. Neither of the checkers 34A and 34B is a single point of failure, assuming they fail in independent ways, due to the presence of the other checker.

The configuration shown in FIG. 5 suffers from the disadvantage that the second checker 34B cannot operate until the first checker 34A finishes its check and outputs the data. This introduces latency: i.e. delivery of data takes twice as long as it would if it were subjected to only one check.

Figure 6:
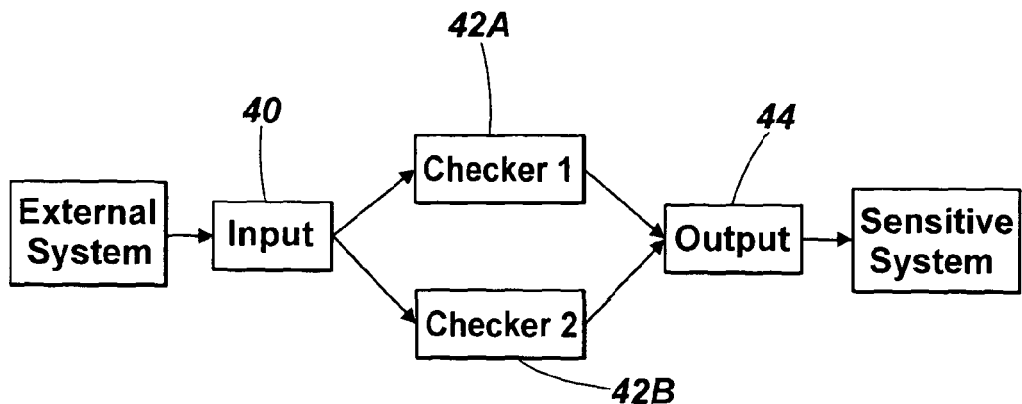
FIG. 6 is equivalent to FIG. 4 with two centrally located checkers in parallel.

Latency can be avoided by performing checks in parallel instead of in series, as shown in FIG. 6, which relates to a prior art technique. Here an input sub-system 40 copies data to two checkers 42A and 42B connected in parallel, and these checkers consequently apply checks to the data simultaneously. If the checks are passed, each of the checkers 42A and 42B sends the data on to an output sub-system 44, but if the checks are failed the respective checker sends a failure message and discards the data.

The output sub-system 44 receives checking results from both checkers 42A and 42B and compares them. If both checkers 42A and 42B indicate that the data passes their checks, and the same data is received from both, the output sub-system 44 delivers the data onwards.

If the input sub-system 40 malfunctions and passes different data to the checkers 42A and 42B, the output sub-system 44 will at best receive different data and will discard it. If one of the checkers 42A and 42B malfunctions, the output sub-system 44 will again receive different results and so discard the data. If the data fails a check and the output sub-system 44 malfunctions then it has no data to pass on. Hence there is no single point of failure. This design is an example of the standard technique of modular redundancy with voting on the outputs, which is known for use in avionics. However, its disadvantage is that it is difficult to scale, since as more checkers are added the number of connections handled by the input sub-system 40 and output sub-system 44 increases.

Figure 7:
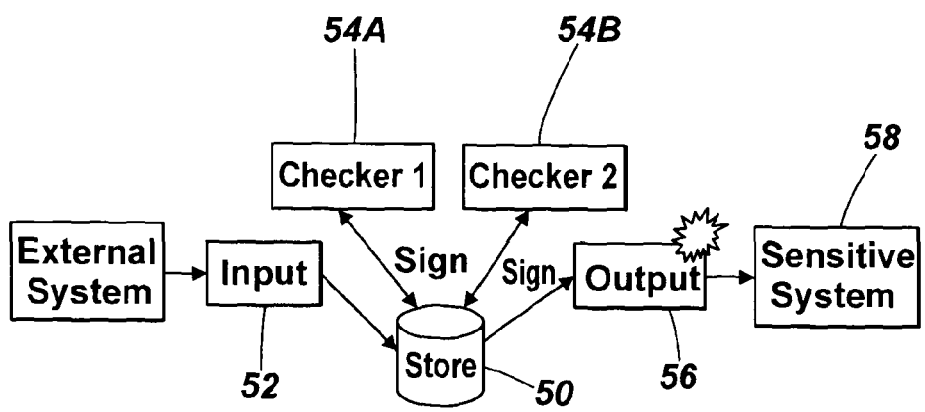
FIG. 7 illustrates the use of multiple checkers with data signatures.

Referring now to FIG. 7, which does not relate to a prior art technique so far as the inventors are aware, it is possible to use a common store 50 and digital signatures to ensure two checks are applied. Here an input sub-system 52 marks incoming data as being unchecked and places it in the store 50. Two checkers 54A and 54B are connected in parallel to the store 50: each of these checkers looks for new data in the store 50, reads such data if available and checks it. If either of the checkers 54A and 54B finds the data is not fit to pass then it deletes that data from the store 50. If one of the checkers 54A and 54B finds that the data is fit to pass, that checker signs the data digitally to indicate that the data has been checked and returns it with the signature to the store 50. An output sub-system 56 then looks for data in the store 50 that has been checked by both checkers 42A and 42B, and, after confirming that the digital signatures are valid, it forwards the data to a sensitive computer system 58. The advantage of this arrangement is that it scales easily since more checkers can be added without changing the connectivity of the input and output sub-systems. However, this arrangement has the disadvantage that the output sub-system 56 is a single point of failure, because it can take data from the store 50 and pass it on without it being checked, and it is complex because of the nature of the comparisons it must perform.

There is also a need for capability to deal with different types of data each requiring a different checker. If a checker arrangement has functionality for all necessary checks in a single sub-system, it is more vulnerable to attack; moreover, establishing that there are no single points of failure in different implementations is more difficult. This may be at least partly dealt with by providing separate content checkers for each type of document that needs to be checked.

Figure 8:
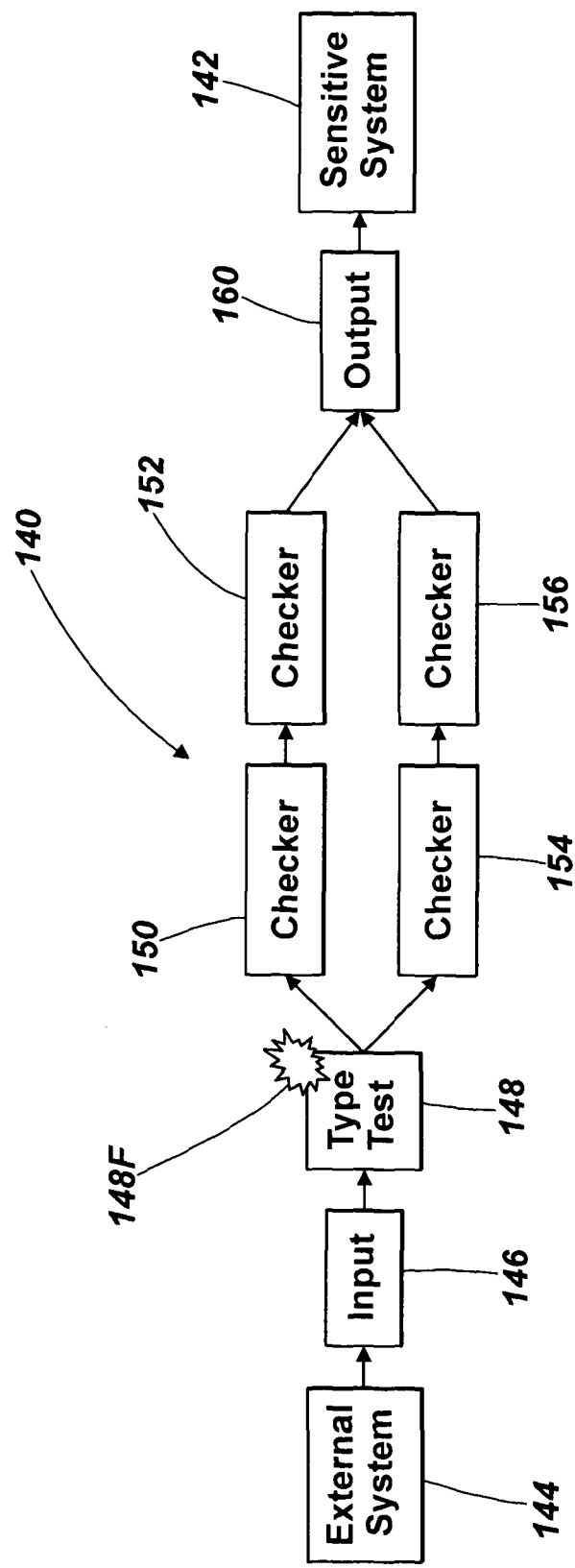
FIG. 8 illustrates a potential single point of failure in a checker arrangement using data type determination.

FIG. 8 shows a checker arrangement 140 with capability to deal with different types of data for protecting a sensitive computer system 142. An external computer system 144 is connected to an input sub-system 146, which is in turn connected to a type test sub-system 148. The type test sub-system 148 has potential for failure indicated by an explosion symbol 148F; it is also connected to a parallel arrangement of two series-connected pairs of content checkers 150 to 156, i.e. a first pair 150/152 in parallel with a second pair 154/156. The parallel arrangement of content checkers 150 to 156 is also connected to an output sub-system 160 itself connected in turn to the sensitive computer system 142.

The checker arrangement 140 operates as follows. The external computer system 144 provides input data to the input sub-system 146, which passes it to the type test sub-system 148. The type test sub-system 148 examines the input data to determine whether it is of appropriate format for checking by the first series-connected pair of content checkers 150 and 152 or the second such pair 154 and 156. The type test sub-system 148 routes the input data to the content checker pair which it selects as more appropriate for the data's format; the data is then checked successively by each checker of the selected pair 150 and 152 or 154 and 156 for suitability for the sensitive computer system 142. If the input data passes the checks of the first of the selected pair of content checkers, that checker passes on the data to the second of the selected pair for further checking similarly; if the input data passes the checks of the second of the selected pair, that checker passes on the data to the output sub-system 160 and thence to the sensitive computer system 142. If any of the checkers 150 to 156 receives input data and finds it is not appropriate for the sensitive computer system 142, it discards the data; consequently, only if both checkers of the selected pair 150 and 152 or 154 and 156 deem the data to be acceptable (i.e. neither of them discards it) does the data reach the output sub-system 160 and the sensitive computer system 142.

At first sight the checker arrangement 140 appears to lack any single point of failure; however the type test sub-system 148 could fail to identify correctly the type or format of data in a document and send it to the wrong checker pair 150/152 or 154/156: if the wrong checker pair can be guaranteed to discard such data this is not serious, but that not is the case for data formats which are special cases of other formats. For example, an RTF document is a special case of plain text: consequently, a plain text checker will not find an RTF document to be harmful, even though the same document when interpreted as RTF might contain damaging data such as macros. Thus if the type test sub-system 148 exhibits a single failure 148F which causes data to be sent to the wrong checker pair 150/152 or 154/156, the result may be data being inadequately checked and passed to the output sub-system 160 and thence to the sensitive computer system 142 contrary to what is required.

Figure 9:
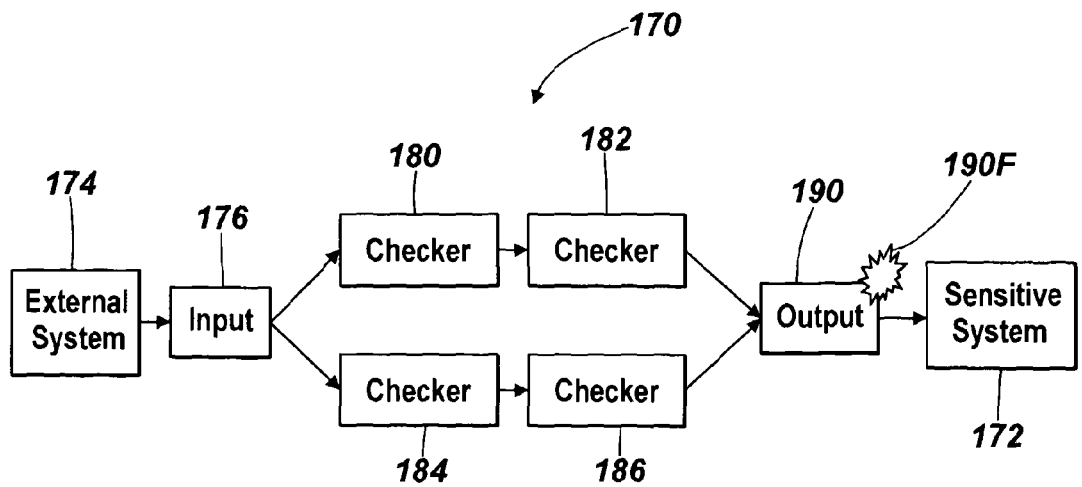
FIG. 9 illustrates a potential single point of failure in a parallel checker arrangement.
Figure 10:
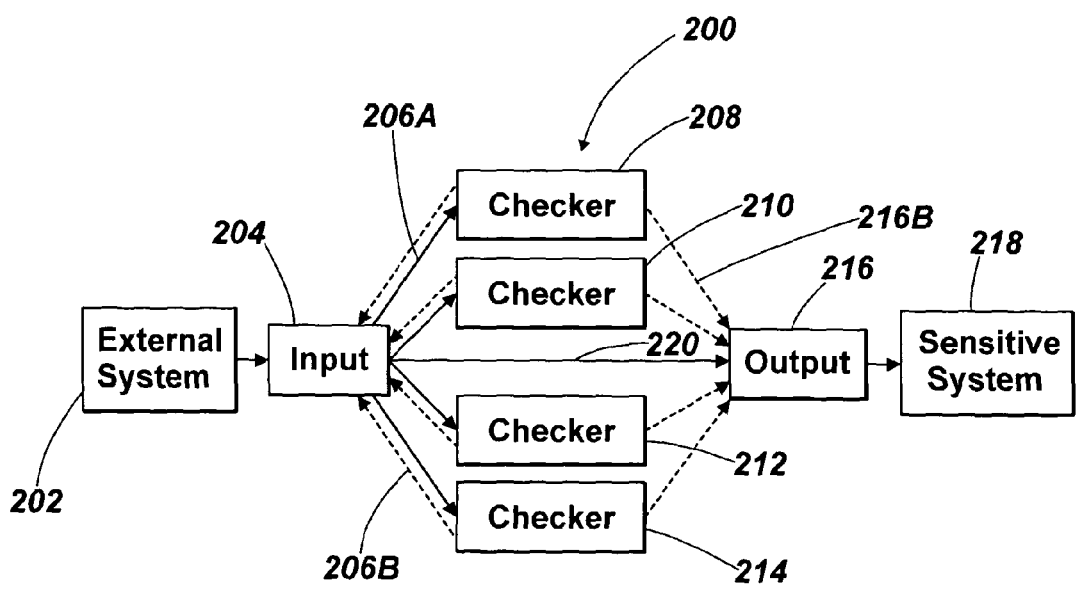
FIG. 10 shows a content checker arrangement of the invention having multiple elements to implement a release decision.

FIG. 9 shows a checker arrangement 170 which avoids the problem of data being sent to the wrong checker pair. Parts equivalent to those described in relation to FIG. 10 are like-referenced with the addition of 30 to the reference numeral. The checker arrangement 170 of FIG. 9 will not be described in detail: it is equivalent to the checker arrangement 140 of FIG. 8 with the removal of the type test sub-system 148, and with all input data passing from the input sub-system 176 to all content checkers 180 to 186. Consequently, the output sub-system 190 may receive multiple copies of the input data, i.e. one copy from each content checker which has not discarded the data because it has not found the data to be unacceptable. The output sub-system 190 only forwards the data if all checkers report that it is acceptable for receipt by the sensitive computer system 172.

The checker arrangement 170 lacks a type test sub-system 148 (see FIG. 8), which therefore cannot be a single point of failure. However, instead the output sub-system 190 has potential to be a single point of failure as indicated by explosion symbol 190F because it might fail to assess correctly the outputs from all of the checkers 180 to 186: in consequence, the output sub-system 190 may forward data received from one of the checkers 180 to 186 if that checker determines such data to be acceptable for receipt by the sensitive computer system 172, even though one or more of the other checkers has discarded that data. For example, some RTF data may be passed to a pair of RTF checkers and a pair of text checkers. If the nature of the RTF data is such as to merit blocking, the text checkers are unlikely to discern this and so will pass the data on to the output sub-system 190. Thus, despite there having been no failure of any of the checkers 180 to 186, the output sub-system 190 has received data that should have been blocked. Hence the output sub-system 190 might pass data on if a malfunction occurs.

The output sub-system 190 could be constructed using fault tolerant techniques such as triple modular redundancy, but the complex checks to be performed make this difficult.

Referring now to FIG. 10, there is shown an embodiment 200 of a checker arrangement of the invention which overcomes the output sub-system malfunction problem discussed above. An external computer system 202 is connected to an input sub-system 204, which itself is connected to a parallel arrangement of four content checkers 208 to 214: this parallel arrangement is also connected to an output sub-system 216, which is connected in turn to a sensitive computer system 218. As before, the content checkers 208 to 214 are designed to check the content of different types of data, i.e. different data formats which require different checkers. Each of the content checkers 208 to 214 therefore checks a respective data format or type.

The checker arrangement 200 operates as follows. Incoming data from the external computer system 202 is passed by the input sub-system 204 to all four checkers 208 to 214 as indicated by solid arrows such as 206A. However, in this embodiment the checkers 208 to 214 do not pass acceptable data on to the output sub-system 216. Instead each checker reports the results of its checks (i.e. whether or not the data has acceptable content) to both the input sub-system 204 and the output sub-system 216 as indicated by chain line arrows such as 206B and 216B. The input sub-system 204 receives the results of the checks by all four checkers 208 to 214, and from those results judges whether or not the data is acceptable for forwarding to the sensitive computer system 218. If the data does not have acceptable content, it is discarded by the input sub-system 204; otherwise, if the data has acceptable content, the input sub-system 204 passes it via a line 220 to the output sub-system 216.

The output sub-system 216 receives the results of the checks by all four checkers 208 to 214. It also receives data from the input sub-system 204 if one of the following events occurs: i.e. (a) the checker results for that data are all positive, i.e. all four checkers determine the data to have acceptable content, or (b) the input sub-system 204 malfunctions and relays the data to the output sub-system 216 when the checker outcomes are not all positive. The output sub-system 216 determines from the results whether or not to pass the data to the sensitive computer system 218. The decision to deliver data to the sensitive computer system 218 is therefore split between the input and output sub-systems 206 and 216: neither of these sub-systems is solely responsible for a decision being correct.

Consequently, if the input sub-system 204 malfunctions and passes data to the output sub-system 216 in error, the output sub-system will not forward that data because the checker results are not all positive. Unacceptable data is therefore not passed on to the sensitive computer system 218 unless both the input sub-system 206 and the output sub-system 216 both malfunction at the same time. The input and output sub-systems 204 and 216 are implemented in such a way that they do not have a common mode of failure, and consequently the checker arrangement 200 avoids having a single point of failure at least as regards releasing data without appropriate checker results using checkers appropriate for that data.

A variant of this approach is also possible. The input sub-system 204 may retain data until the data is requested by the output sub-system 216: this does not affect the criterion that data is not passed unless it is found to be acceptable by both input and output sub-systems 204 and 216, but it has the advantage of placing the output sub-system 216 in control, which is often easier to implement.

It would seem that the checker arrangement 200 entirely avoids a single point of failure. However, there is another potential failure mode: the input sub-system 204 could fail by sending different data to the checkers 208 to 214 as compared to data that it sends to the output sub-system 216. If the input sub-system 204 sends acceptable data to the checkers 208 to 214 but unacceptable data to the output sub-system 216, the output sub-system 216 will receive all positive checker outcomes and will therefore wrongly determine that the unacceptable data is suitable for passing on to the sensitive computer system 218. This potential failure mode corresponds to a single point of failure: it may be obviated by the use of cryptographic techniques. In this regard a cryptographically strong hash of data is a function that generates a value which characterises that data, and it is a property of such a hash that it is impractical to find two different items of data having the same hash value. An example of such a function is SHA-256.

Using a cryptographic hash approach, when any one of the checkers 208 to 214 determines a "pass" outcome, i.e. data is determined to be suitable for passing on to the sensitive computer system 218, that checker applies a hash function to the data to produce a value that identifies the data it has checked (no hash is sent for data which has failed the check). This value is sent along with the "pass" outcome to the output sub-system 216. The hash value cannot be used to determine the data to which it relates, so the output sub-system 216 can still only pass on data which it has received from the input sub-system 204. However, the hash value allows the output sub-system 216 to confirm that the data received from the input sub-system 204 is the same as that checked by the checkers. The output sub-system 216 does this by applying the hash function to the data received and confirming that the value obtained is the same as received from the checkers 208 to 214. So if the input sub-system 204 malfunctions and sends data to the checkers 208 to 214 which is different to that sent to the output sub-system 216, the output sub-system discards that data because the data hash values from the checkers are not equal to the hash value of data from the input sub-system 204. With this cryptographic approach, neither the input sub-system 204 nor the output sub-system 216 represents a single point of failure.

In the checker arrangement 200, each of the checkers 208 to 214 has respective separate connections to the input sub-system 204 and the output sub-system 216. In an alternative embodiment, checkers are not connected to input and output sub-systems: instead the checkers and input and output sub-systems are all connected to a common store. The store is for use in conjunction with encryption and signing of data to ensure all required checks are made. In this alternative arrangement, the input sub-system encrypts received data and places the resulting encrypted data in the store. Apart from the input sub-system, only the checkers have access to a key suitable for decryption of the encrypted data, which consequently cannot be read by the output sub-system. Each of the checkers decrypts and checks the data, and stores its results of checking (pass or fail outcome) in the store together with a digital signature that can be verified by both the input and output sub-systems. Once all the checkers have completed their checks, the input sub-system accesses the store, checks the checkers' results and their digital signatures. If the results are all positive (pass outcome) and all digital signatures are valid, the input sub-system decrypts the data and stores it in decrypted form in the store. The decrypted data can now be read by the output sub-system, which also checks all the checkers' results: if the checkers' results are all positive, the output sub-system takes the decrypted data and forwards it on to a sensitive computer system. Should the data fail any checks, the output sub-system cannot malfunction by forwarding it in decrypted form as it will not have been decrypted by the input sub-system unless that has also malfunctioned. Consequently, a single point of failure does not result in unacceptable data being forwarded to the sensitive computer system.

It is possible to adapt the checker arrangement 200 to cope with data formats which the checkers 208 to 214 do not recognise. A checker may indicate that data is fit to pass to a sensitive computer system because it does not recognise the format of the data. For incoming data this gives difficulty if, for example, there is unanticipated functionality in a software application which is running on the sensitive computer system and which may interpret the data in a damaging way. As regards outgoing data, an application might have encoded some sensitive information therein: if the outgoing data format is not recognised by the checkers, the data's unsuitability for sending out will not be detected.

To avoid the problem of passing data with an unrecognised format, all checkers are arranged to process data and report one of three states: i.e. the data is (1) recognised and accepted, (2) recognised and rejected or (3) not recognised. The input and output sub-systems apply tests to ensure that data is allowed to pass only if recognised and allocated a pass outcome by at least two checkers and not rejected by any checker.

The input and output sub-systems may be arranged to implement more complex tests designed to ensure that if data is recognised by one checker it is also recognised by one or more others. For example, data which is recognised by an RTF checker should always be recognised by a text checker, because RTF is a special case of text. They may also be arranged so the number of checkers required to report the data is recognised and accepted before it is released varies according to the type of data. For example, two checkers might need to report the acceptability of text documents but three might need to report the acceptability of RTF documents because this is a more complex format and more confidence in the checks is required.

The checker arrangement 200 of FIG. 10 avoids single points of failure. However it is possible that checking might not be effective if the wrong checkers were to be specified or a relationship between related data formats were to be misinterpreted. One way of avoiding checker specification failure is to provide multiple suites of checkers which are independently specified and developed. Suites of checkers may be arranged either in series or in parallel.

Figure 11:
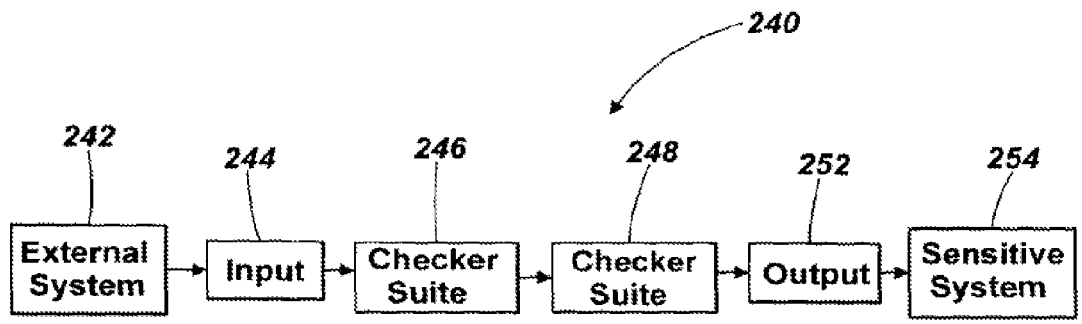
FIG. 11 shows a content checker arrangement of the invention having multiple suites of checkers in series.

Referring now to FIG. 11, a checker arrangement 240 of the invention is shown which uses checker suites which are developed and specified independently and arranged in series. An external computer system 242 is connected to an input stage 244, which is in turn connected to a first suite of content checkers 246 in series with a second such suite 248. Each of the suites 246 and 248 consists of a respective set of content checkers (not shown) arranged in parallel as illustrated in FIG. 10 for checkers 208 to 214. The second suite 248 is also connected to an output stage 252, which itself is connected to a sensitive computer system 254.

Each of the suites 246 and 248 has its own input and output sub-systems (not shown), which assess results from the respective suite's entire set of checkers to determine whether or not to pass the data. The pass/fail output sub-system of the first checker suite 246 passes data to the input sub-system of the second checker suite 248 if the data is judged acceptable: here, in the case of data with a prearranged recognised format, "acceptable" means allocated a pass outcome by all checkers in the suite. In the case of data not necessarily having a prearranged recognised format, "acceptable" means recognised and allocated a pass outcome by at least two checkers in the suite and not rejected ("failed") by any checker in the suite. Likewise, if the second checker suite 248 judges data acceptable on the same basis, it passes on the data to the output stage 252, and thence to the sensitive computer system 254. Data which is found not to be acceptable by one or both of the suites 246 and 248 is discarded and does not reach the sensitive computer system 254.

Figure 12:
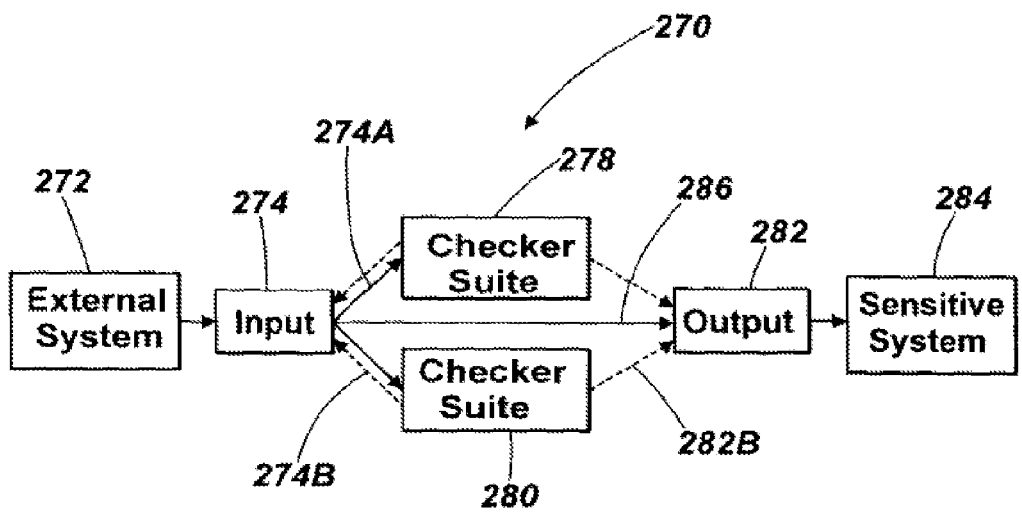
FIG. 12 shows a content checker arrangement of the invention having multiple suites of checkers in parallel.

Referring now to FIG. 12, a checker arrangement 270 of the invention is shown which uses checker suites in parallel. In the checker arrangement 270, an external computer system 272 is connected to an input stage 274, which is in turn connected to a parallel arrangement of two content checker suites 278 and 280. Each checker suite provides its own input and output sub-systems (not shown), which assess the results of all of that suite's checkers to determine whether or not to pass on the data. The parallel arrangement of content checker suites 278 and 280 is also connected to an output stage 282 connected in turn to a sensitive computer system 284. Each of the content checker suites 278 and 280 consists of a respective set of content checkers arranged in parallel as illustrated in FIG. 10 for checkers 208 to 214.

The checker arrangement 270 operates as follows. Incoming data from the external computer system 272 is passed by the input stage 274 to all of the checkers in each of the suites 278 and 280 as indicated by solid arrows such as 274A. Each checker suite's input and output sub-systems assess the results of the suite's checkers to determine a pass or fail outcome for the incoming data, and then provides a single collective outcome: e.g. the outcome may be fail if any one or more checkers indicates fail, or pass if the data is allocated a pass outcome by at least two checkers in the suite and not rejected by any other checker in the suite (as for the checker arrangement 240).

Each of the suites 278 and 280 reports the single collective outcome of its checks to the input and output stages 274 and 282 as indicated by chain line arrows such as 274B and 282B. From the single collective outcomes of both suites 278 and 280, the input stage 274 judges whether or not the data is acceptable for forwarding to the sensitive computer system 284. If the data is not acceptable, it is discarded by the input stage 274; otherwise, if the data is acceptable, the input sub-system passes it via a line 286 to the output stage 282. If the output stage 282 confirms that the data is acceptable, it passes the data on to the sensitive computer system 284.

Figure 13:
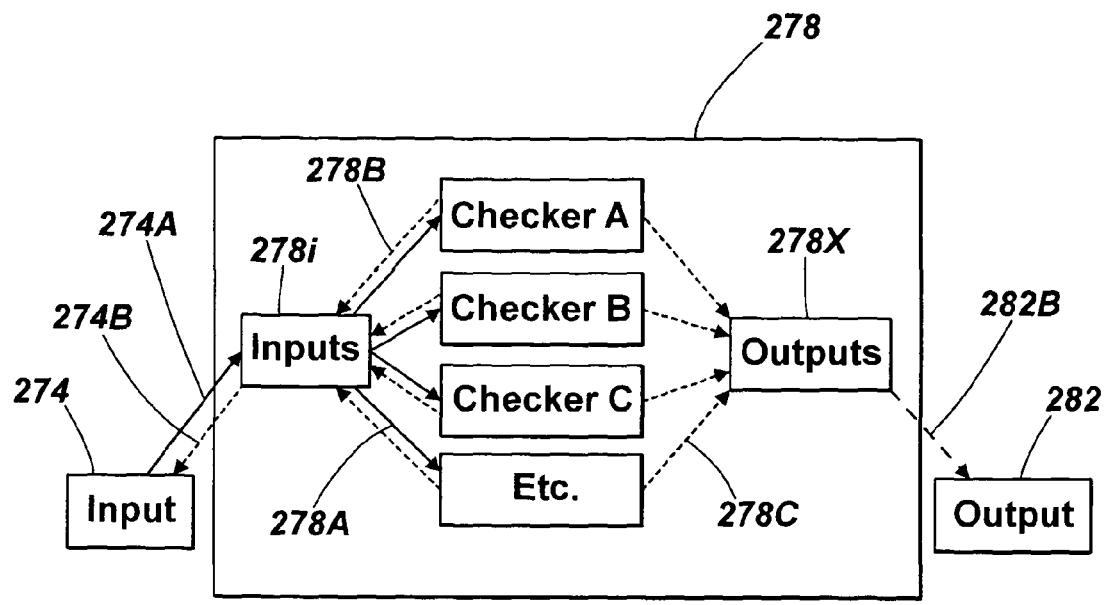
FIG. 13 shows a checker suite incorporated in the FIG. 12 checker arrangement.

Referring now also to FIG. 13, there is shown a part of the checker arrangement 270 of FIG. 12 in more detail, i.e. the input stage 274, first checker suite 278, output stage 282 and connections 274A, 274B and 282B. The first checker suite 278 has input and output sub-systems 278$i$ and 278$x$, together with checkers labelled Checker A, Checker B, Checker C and "Etc.": here Checkers A to C indicate three individual checkers respectively and "Etc." indicates one or more additional checkers, the total number of checkers being as necessary for use in the checker arrangement 270.

In operation, as indicated by solid arrows such as 274A and 278A, incoming data passes to individual checkers (e.g. Checker A) in the first checker suite 278 via the input stage 274 and input sub-system 278$i$; each of these checkers determines a respective pass or fail outcome for the incoming data and passes it to the input and output sub-systems 278$i$ and 278$x$ as indicated by chain line arrows such as 278B and 278C. The input and output sub-systems 278$i$ and 278$x$ assess these outcomes and, as described previously, provide respective single collective outcomes via connections 274B and 282B to the input stage 274 and output stage 282. The first and second checker suites 278 and 280 have like construction and mode of operation. To ensure that no provider of checking sub-systems represents a common point of failure, two independent providers may be used—one of whom provides the input sub-system 278$i$ and a suite of checkers while the other develops the output sub-system 278$x$ and a second suite of checkers.

There exists another consideration affecting content checkers, in that a data file may contain more than one type of data: i.e. one type of data may contain another type of data embedded in it. This may be accommodated by a more complex arrangement of checkers. For convenience of description, such an arrangement will be described for an individual suite of checkers (as opposed to a set of pair-wise checkers).

Figure 14:
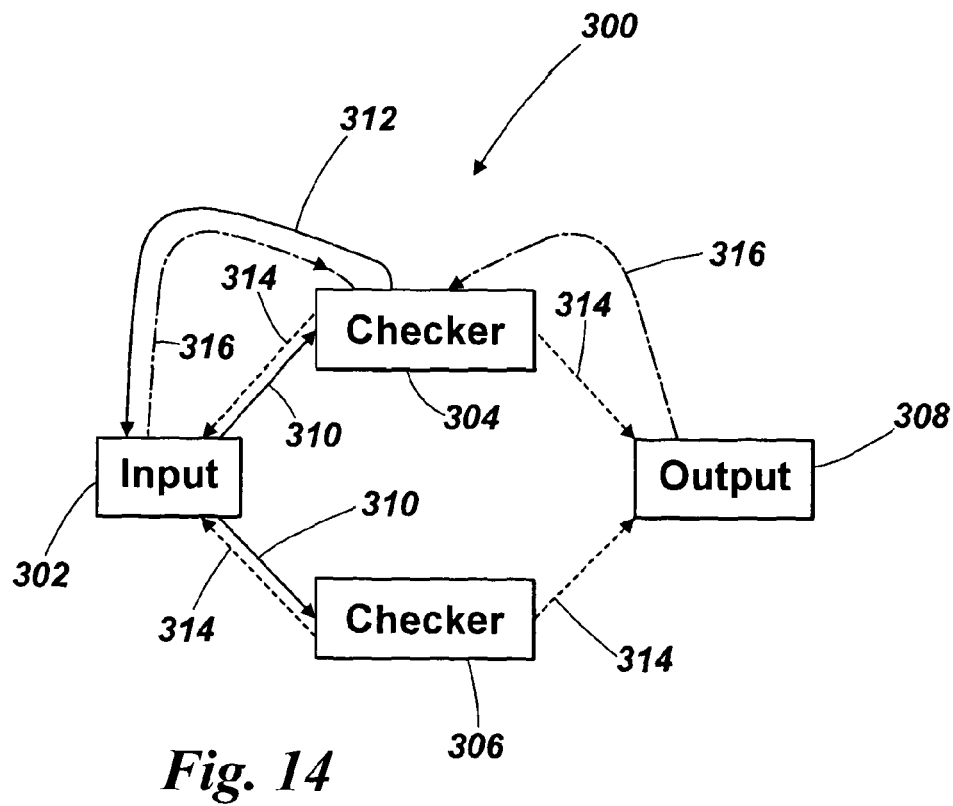
FIG. 14 shows a content checker arrangement of the invention suitable for checking data of one type in which data of another type is embedded.

Referring now to FIG. 14, part of an embodiment 300 of a checker arrangement of the invention is shown which is suitable for checking embedded data. Connections to external and sensitive computer systems and other suites of checkers are not shown. The checker arrangement 300 incorporates a checker suite which has an input sub-system 302 connected to multiple content checkers represented by two content checkers 304 and 306 for convenience of illustration (a checker suite will normally have more than two content checkers). The content checkers 304 and 306 are connected to an output sub-system 308.

Incoming data is passed by the input sub-system 302 to both checkers 304 and 306, as indicated by solid arrows 310. Each checker assesses the data to determine a pass, fail or unrecognised outcome; i.e. there are three possible outcomes, (a) recognised and accepted, (b) recognised but rejected, and (c) not recognised. However, in this embodiment, one or both of the checkers 304 and 306 may identify embedded data of a type that it cannot check in the otherwise checkable incoming data: if so, the checker extracts the embedded data and passes it back to the checker suite's input sub-system 302 as indicated by solid arrow 312 in the case of checker 304 (another checker could also have this function). The embedded data is then checked as before, by passing it to the entire set of checkers in the checker suite, and the results of these checks and hashes of the data are passed to both input and output sub-systems 302 and 308 for assessment as indicated by chain line arrows 314. Subsequently, both the input and output sub-systems 302 and 308 pass the results of the checks back to the checker that identified the embedded data. Neither of the input and output sub-systems 302 and 308 forwards the data. The checkers 304 and 306 are therefore permitted to invoke checking recursively.

The checker 304 or 306 that identified the embedded data receives the results of recursive checking from both the input and output sub-systems 302 and 308, as indicated by dot/dash arrows 316. The results received from each of these subsystems also include a respective cryptographic hash of the data checked. The checker confirms that the same results are received from both the input and output sub-systems 302 and 308 and that the hashes are both correct, in that they correspond to the embedded data submitted for checking.

If the results of these checks are acceptable, the invoking checker continues to check data hitherto unchecked in the incoming data. If the results of these checks are not acceptable, the data is discarded and a 'reject' result is returned for the document or file in which the data is contained. As with all recursive routines, to avoid infinite recursion a limit is defined regarding maximum depth of embedding and a count of depth of checking is passed with the data to enable recursion to be terminated at this limit: otherwise, infinite recursion would be possible, e.g. for data formats with a malformed structure which represents a document that contains itself. An example of this is a first ZIP file that contains a second ZIP file that contains the first.

Should a first checker fail to identify some embedded content or fail to assess the results of a check correctly, no damage should result because a second checker (which is developed independently of the first checker) should succeed in so doing.

Where data of one format is embedded in some container data of another format, the embedded data can appear to be valid with respect to both formats. For example, a ZIP file may be embedded in a MIME document using a binary encoding. Such a MIME document meets the specification of a MIME document as well as a ZIP file. As long as the data is acceptable as regards both MIME and ZIP formats, the checkers will pass it. However, the embedded data (ZIP in this case) is checked twice: a ZIP checker treats the data as a ZIP file with arbitrary data at the start and end, and a MIME checker treats the data as a MIME file containing the ZIP file as embedded data.

To avoid the inefficiency of the embedded data being checked twice by each of the checkers, the input sub-system 302 may be arranged to calculate a cryptographic hash for data which has been extracted and check the hash against hashes of previously checked data. If a match is found, the input sub-system 302 returns a like checking result as returned previously instead of sending the data for checking. The output sub-system 308 must also maintain a list of hashes that have been reported to it as corresponding to successfully checked data, and report to the checker 304 or 306 which finds some embedded data that such data has already been checked successfully and need not be checked again.

In some cases it may be useful for a content checker to modify data presented to it, e.g. to remove redundant but undesirable content rather than to prevent the data being delivered because of the presence of such content. For example, in the case of a content checker for an image file format incorporating scan lines, it might be appropriate for the checker to set unused pixel data at the end of each scan line to zero. For embodiments in which the input sub-system forwards data to the output sub-system, modified data must be delivered back to the input sub-system for such forwarding. Moreover, embodiments in which the checker reports a checking outcome to the output sub-system with a cryptographic hash of data, the hash must be of the modified data.

It is assumed that each of the checkers in an embodiment of the invention will modify data in the same way. For simple transformations this is not a problem, but if a complex transformation were to be required it becomes less likely that two independent checker implementations will produce exactly the same result, in which case the hash values produced will be different and an output sub-system will not pass on data associated with two or more different hash values. This problem is avoidable by transforming data before it is checked, so that checkers do not need to modify it.

The functionality of elements of the embodiments of the invention described with reference to FIGS. 10 to 14 may be implemented by one or more software applications running on a single computer connected between the external system (e.g. 202) and the sensitive computer system (e.g. 218), or by one or more software applications running the sensitive computer system itself (which the application or applications protect). In particular, such application or applications would implement the functionality of all elements illustrated in any one of FIGS. 10 to 14 with the exception of the functionality indicated in the description and accompanying drawings for an external system (202, 242, 272) or a sensitive computer system (218, 254, 284).

The procedures given in the foregoing description can clearly be implemented by appropriate computer software comprising instructions encoded upon an appropriate carrier medium and running on a conventional computer system. The carrier medium may be a memory, a floppy or compact or optical disc or other hardware recording medium. Such software is straightforward for a skilled programmer to implement from the foregoing description without requiring invention, because it involves well known computational procedures

The invention claimed is:

1. An automated method of checking data content passed between systems comprising using a computer system to implement the steps of:
   receiving incoming data from a first system and subjecting the incoming data to multiple different content checks,
   sending the results of the multiple different content checks to an input sub-system and, separately to an output sub-system
   allowing the incoming data to pass from the input sub-system to the output sub-system if the multiple different content checks provide an indication to the input subsystem that the incoming data has passed the content checks, and making the incoming data available for further processing by a second system if the output sub-system at least receives the incoming data and the multiple different content checks provide an indication to the output sub-system that the incoming data has passed the content checks.

2. A method according to claim 1 including making the data available to the output sub-system in response to the input sub-system receiving a request in this regard associated with the output sub-system in addition to the indication that the data has passed the content checks.

3. A method according to claim 1 including:
a) applying a cryptographic hash function to data which has passed its respective content check to generate a checking hash value,
b) applying the cryptographic hash function to data which has passed from the input sub-system to generate a verification hash value and comparing the checking hash value with the verification hash value, and
c) passing on the data for further processing provided that the checking hash value is the same as the verification hash value and the data which has passed from the input sub-system has been indicated to have passed the content checks.

4. A method according to claim 1 including:
a) encrypting the incoming data and depositing such encrypted data in a store,
b) decrypting the encrypted data, performing the multiple different content checks and storing the results of such check in the store together with digital signatures associated with respective verifiable checks by the input sub-system and the output sub-system,
c) making the incoming data available in decrypted form for further processing in the event that at least the data has passed the content checks and the digital signatures are valid.

5. A method according to claim 1 wherein each of the multiple content checks provides one of three outcomes as follows, i.e. data is (a) recognised and accepted, (b) recognised and rejected or (c) not recognised.

6. A method according to claim 1 wherein the multiple content checks are performed by suites of content checkers, the suites having been specified and developed independently of one another.

7. A method according to claim 1 including using multiple content checking to detect data embedded in an incoming data item, the embedded data and the data item having different formats, and the method including recycling the embedded data for further multiple content checking, and, if data already checked in the data item is acceptable, continuing to check data remaining unchecked in the data item.

8. Apparatus for automated checking of data content passed between systems comprising:
a) a computer system that receives incoming data from an external computer system and subjects the incoming data to multiple different content checks, the computer system sending the results of the multiple different content checks to an input sub-system and separately to an output sub-system,
b) the computer system allowing the incoming data to pass from the input sub-system to the output sub-system if the multiple different content checks provide an indication to the input sub-system that the data has passed the content checks, and
c) the computer system making the incoming data available for further processing by a second system if the output sub-system at least receives the incoming data and the multiple different content checks provide an indication to the output sub-system that the incoming data has passed the content checks.

9. Apparatus according to claim 8 wherein the computer system is also programmed to make the data available to the output sub-system in response to the input sub-system receiving a request in this regard associated with the output sub-system in addition to the indication that the data has passed the content checks.

10. Apparatus according to claim 8 wherein the computer system is also programmed to:
a) apply a cryptographic hash function to data which has passed its respective content check to generate a checking hash value,
b) apply the cryptographic hash function to data which has passed from the input sub-system to generate a verification hash value and comparing the checking hash value with the verification hash value, and
c) pass on the data for further processing in the event that the checking hash value is the same as the verification hash value and the data which has passed from the input sub-system has been indicated to have passed the content checks.

11. Apparatus according to claim 8 wherein the computer system is also programmed to:
a) encrypt the incoming data and deposit data so encrypted in a store,
b) decrypt the encrypted data to provide decrypted data,
c) means for performing the multiple different content checks upon the decrypted data and storing the results of such check in the store together with digital signatures associated with respective verifiable checks by the input subsystem and the output sub-system, and
d) make the incoming data available in decrypted form for further processing in the event at least that the data has passed the content checks and the digital signatures are valid.

12. Apparatus according to claim 8 wherein each of the multiple different content checks provides one of three outcomes as follows, i.e. data is (a) recognised and accepted, (b) recognised and rejected or (c) not recognised.

13. Apparatus according to claim 8 wherein the computer system is programmed to perform the multiple different content checks with suites of content checkers, the suites having been specified and developed independently of one another.

14. Apparatus according to claim 8 for detecting data embedded in a data item, the embedded data and the data item having different formats, wherein the computer system is programmed to recycle the embedded data for checking by the multiple content checking means, and, if data already checked in the data item is acceptable, to continue to check data remaining unchecked in the data item.

15. A computer program product comprising a non-transitory computer readable medium containing computer readable instructions for controlling operation of a computer system to undertake automated checking of data content passed between systems by implementing the steps of:
a) receiving incoming data from a first system and subjecting the incoming data to multiple different content checks and sending the results of the multiple content checks to an input sub-system and separately to an output sub-system,
b) allowing the incoming data to pass from the input subsystem to the output sub-system if the multiple different content checks provide an indication to the input subsystem that the incoming data has passed the content checks, and c) making the incoming data available for further processing by a second system if the output sub-system at least receives the incoming data and the multiple different content checks provide an indication to the output subsystem that the incoming data has passed the content checks.

\* \* \* \* \*